Sept. 17, 1957  R. J. RICKERT  2,807,014
ZERO SPEED DETECTOR

Filed Aug. 9, 1955  2 Sheets-Sheet 1

INVENTOR.
ROYCE J. RICKERT
BY
ATTORNEY
AGENT

Sept. 17, 1957  R. J. RICKERT  2,807,014
ZERO SPEED DETECTOR

Filed Aug. 9, 1955  2 Sheets-Sheet 2

INVENTOR.
ROYCE J. RICKERT
BY
ATTORNEY
AGENT

United States Patent Office 2,807,014
Patented Sept. 17, 1957

2,807,014

ZERO SPEED DETECTOR

Royce J. Rickert, Park Forest, Ill., assignor, by mesne assignments, to the United States of America as represented by the Secretary of the Air Force Application August 9, 1955, Serial No. 527,431

7 Claims. (Cl. 340—271)

This invention provides a device which may be used to determine whether an object such as a rotating shaft or a reciprocating member has ceased all motion or has reached an arbitrarily low speed which, for all practical purposes, may be considered rest. Where large machines having moving parts of great mass are concerned, this information is necessary whenever operations are to be performed that might cause damage to the equipment of the involved parts are in motion. The need for such a device is of particular importance if the equipment is remote from the operator.

Ordinary tachometers are not suitable for the above purpose since they are incapable of indicating the very slow speeds which are possible in heavy, high inertia machines as they come to rest. Although various mechanical devices could be used to indicate such slow speed, arrangements involving a mechanical coupling to the shaft or other moving member are undesirable due to the wear occurring at full speed operation. Further, devices which employ photoelectric tubes and other electron tubes, while they may avoid mechanical couplings, are not sufficiently reliable to be entrusted with the protection of expensive equipment. The device described herein is entirely electromagnetic in nature and thus has a high degree of reliability while at the same time a mechanical coupling to the moving member of the machine is not required.

The zero speed detector may be used, for example, to indicate the speed of a wind tunnel compressor shaft where various stages of the compressor are coupled or uncoupled by remotely controlled disconnects. In this case, the shaft is provided with a notched collar of a material having good magnetic permeability which, in passing the core of a specially designed transformer, varies the primary leakage flux and therefore the secondary voltage. The intervals between secondary voltage changes are sensed by a system of delayed action relays which energize an indicating circuit when this interval exceeds a predetermined value. The circuit interconnecting the transformer and delayed action relays also contains a check-out circuit to test the operability of the speed detector circuit prior to its use.

Figure 1:
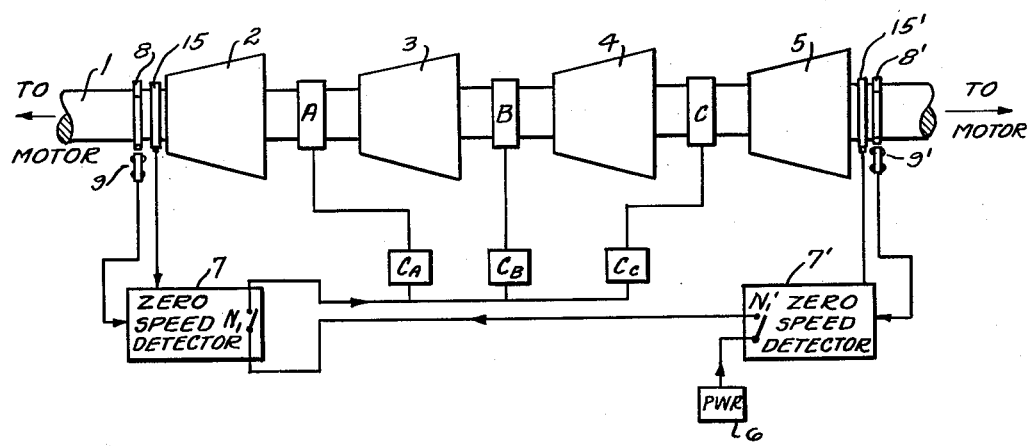
Figure 3:
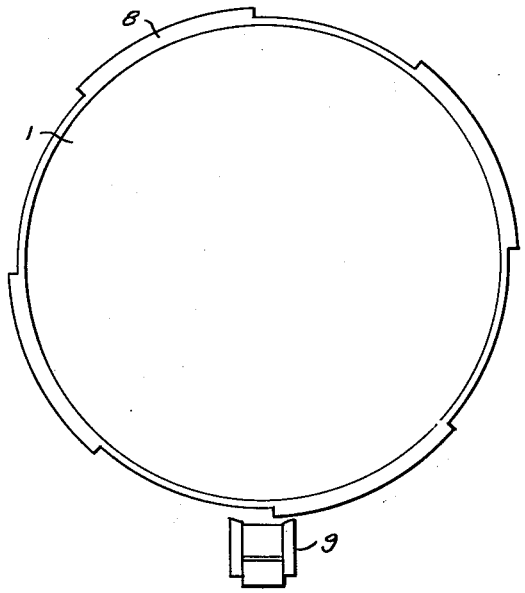
Figure 2:
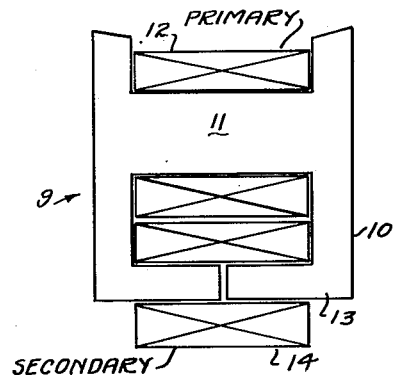
Figure 4A:
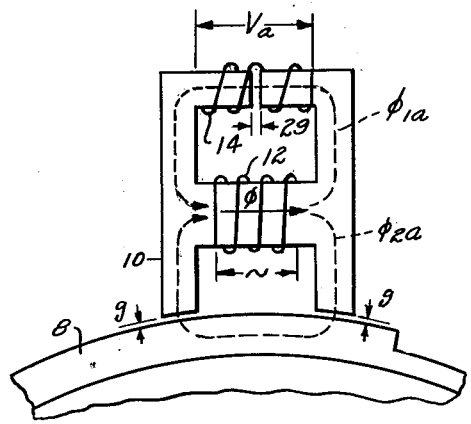
Figure 4B:
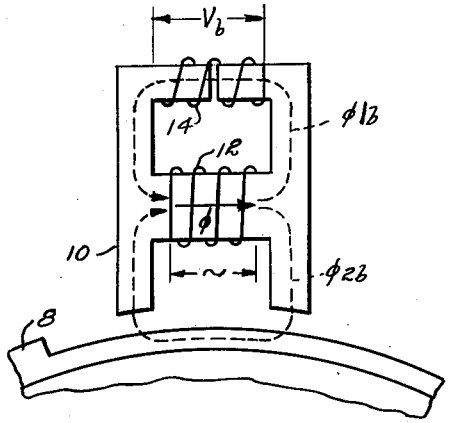
Figure 5:
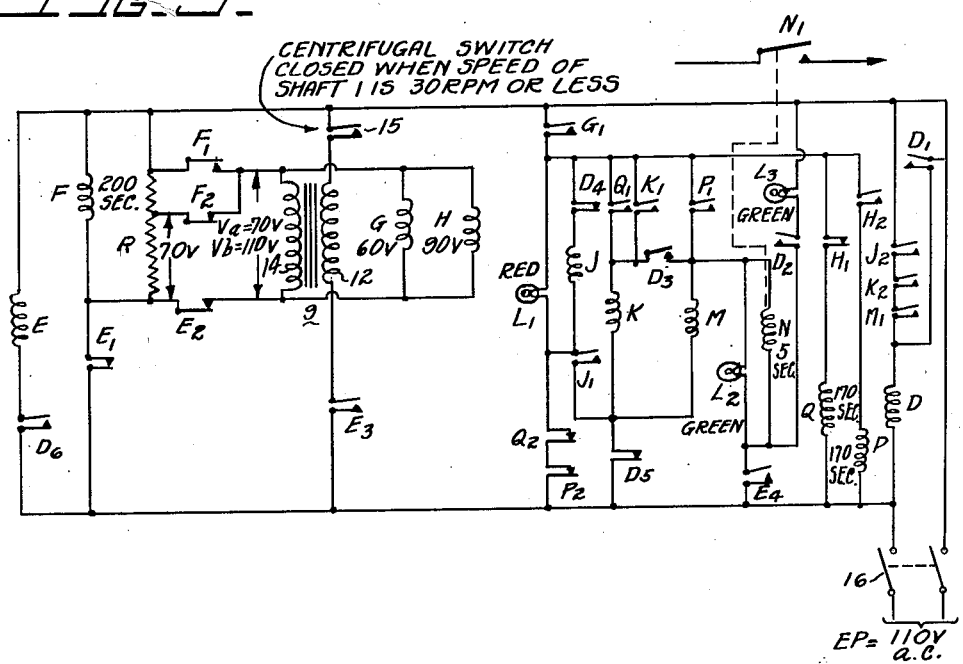

The invention will be more fully explained in connection with the specific embodiment thereof shown in the accompanying drawings in which, Fig. 1 is a block diagram of the invention as applied to a wind tunnel compressor shaft, Fig. 2 illustrates the speed sensing transformer, Fig. 3 shows the notched shaft collar and its manner of cooperating with the speed sensing transformer, Figs. 4a and 4b illustrate the theory of operation of the speed sensing transformer, and Fig. 5 is a schematic diagram of the speed detector and check-out circuits.

Referring to Fig. 1, 1 indicates the shaft of a wind tunnel air compressor having stages 2—5. The shaft is driven from both ends by suitable motors (not shown), and disconnects A, B and C are situated between the four compressor stages so that any number of the four stages may be simultaneously driven. The disconnects are controlled from remote control stations $C_A$, $C_B$ and $C_C$ which are energized from power source 6 through series connected switches $N'$ and $N_1$ of similar zero speed detector circuits 7 and 7'. The zero speed detector circuits 7 and 7', which are activated by centrifugal switches 15 and 15' at a moderately low speed such as 30 R. P. M., sense the speed of the shaft below this value by means of steel collars 8 and 8' and associated speed sensing transformers 9 and 9'. When the speed of either end of shaft 1 is zero, or below an arbitrarily selected low value, the contact in the associated zero speed indicator is closed. Closure of both contacts is required before the disconnects can be operated from control stations $C_A$, $C_B$ and $C_C$.

The speed sensing transformer is illustrated in Fig. 2. It comprises a core 10 having a branch 11 around which the primary winding 12 is wound and a branch 13 around which the secondary winding 14 is wound. The relationship between the transformer and the collar 8 is shown in Fig. 3 and in more detail in Figs. 4a and 4b.

Referring to Figs. 4a and 4b, for a constant A. C. energization of the primary winding 12, the voltage across the secondary winding 14 will have a minimum value $V_a$ when the transformer core 10 and the collar 8 have the relationship shown in Fig. 4a and a maximum value $V_b$ when the relationship is as shown in Fig. 4b. As illustrated in the drawing, the total flux produced by the primary magnetomotive force divides into two loops, one linking the primary and secondary windings and designated $\phi 1a$ and $\phi 1b$ in the drawing, and the other following a leakage path through the collar and designated $\phi 2a$ and $\phi 2b$ in the drawing. In an arrangement of this kind the flux linking the secondary winding is influenced by the amount of leakage flux. Thus when a tooth of collar 8 is directly beneath the core, as in Fig. 4a, the leakage path has its maximum permeance, the leakage flux has its maximum value, the flux linking the secondary has its minimum value $\phi 1a$ and the secondary voltage has its minimum value $V_a$. When the transformer core is situated midway between adjacent teeth of collar 8 as in Fig. 4b, the leakage path has its minimum permeance, the flux linking the secondary has its maximum value $\phi 1b$ and the secondary voltage has its maximum value $V_b$. With 110 v. primary voltage and a 1:1 winding ratio, $V_b$ may have a value of 110 v. and $V_a$ may be 40 volts less or 70 v. In a transformer of this type the flux density in the core must be low to prevent saturation and, for best operation, the current drawn from the secondary should be kept low, ten percent or less of the primary magnetizing amount, so that the reaction flux of the secondary current will not appreciably affect the secondary voltage.

The details of zero speed detector circuits 7 and 7' are shown in Fig. 5. The operation of this circuit will be explained in connection with the specific application of the zero speed detector shown in Fig. 1. Also, the following parameters will be assumed:

Power supply voltage:
$E_p = 110$ v. A. C.
$V_a = 70$ v. A. C.
$V_b = 110$ v. A. C.
Diameter of collar 8 = 38.2 inches
Circumference of collar 8 = 120 inches
Tooth width = 15 inches (four teeth)

The circuit operates at speeds from 30 to 0 R. P. M., however, 1/20 R. P. M. is the lowest speed which the shaft 1 will coast. In this range the following collar rim speeds and times exist:

| R. P. M. | Rim speed, in./min. | Rim speed, in./sec. | Rim speed, sec./in. | Interval between voltage changes (Va, Vb), sec. |
|---|---|---|---|---|
| 30 | 3,600 | 60 | 0.0167 | 0.250 |
| 1 | 120 | 2 | 0.5 | 7.5 |
| 1/20 | 6 | 0.1 | 10 | 150 |

Since failure of the speed detector circuits might result in serious damage to the compressor shaft disconnects, a check-out circuit is provided in Fig. 5 in addition to the speed sensing circuit. The check-out circuit, by applying artificial signals to the speed sensing circuit, causes the latter to go through a complete cycle satisfactorily before a test for shaft speed can be made. This feature greatly reduces the probability of faulty operation of the speed sensing circuit. The detailed operation of Fig. 5 is as follows:

Check-out operation

The speed detector circuit is placed in operation by the application of power, as by closure of power switch 16. When this switch is closed, 110 volts A. C. is applied across relay F and potential divider R through contacts E1. This relay, which may be of the pneumatic timing type, has a delay of 200 seconds and therefore is not actuated immediately. The purpose of potential divider R is to supply two artificial signals across the secondary 14 of speed sensing transformer 9 equal to the signals $Va=70$ v. and $Vb=110$ v. normally supplied at this point when the transformer is operative. Therefore, at this time, 70 v. is applied through contacts F2 and E2 to relays G and H. Relay G is designed to operate at 60 volts and is therefore actuated, but relay H, which is designed to operate at 90 volts, is unaffected.

Operation of relay G energizes red indicator light L1 through contacts G1. Closure of contacts G1 also energizes relay J which holds through contacts J1. Further, relay Q is energized through contacts G1 but this relay, having a delay of 170 seconds, is not immediately operated. After 170 seconds, relay Q operates causing relay K to be energized through contacts Q1. Relay K holds through contacts K1.

After 200 seconds, relay F operates causing F2 to open and F1 to close thus raising the potential across the secondary to 110 volts. The higher voltage causes relay H to operate which deenergizes relay Q at contacts H1 and energizes relay P through contacts H2. Relay P has a delay of 170 seconds and therefore does not operate immediately.

Relay P operates 170 seconds after relay F operates or 370 seconds after switch 16 was closed. Operation of this relay energizes relay M through contacts P1. Since relays J, K and M are now energized, voltage is applied to relay D through contacts J2, K2 and M1 which operates and holds through contacts D1.

Operation of relay D deenergizes relays J, K and M at D5 and energizes relay E at D6. L1 is extinguished by the opening of J1. Operation of relay E deenergizes relay F and potential divider R at E1, and also removes the load presented by R to the secondary by opening contacts E2. Removal of voltage from R deenergizes relays G and H. Deenergization of H allows H2 to open which deenergizes relay P.

Operation of relays D and E also energizes green indicator light L3, through closure of contacts D2 and E4, indicating that the circuit has been checked and is in operative condition.

Speed sensing operation

If the circuit has satisfactorily checked-out as described above, relays D and E will be energized. If the speed of shaft 1 is below 30 R. P. M., or when it falls to 30 R. P. M., 110 v. A. C. is applied through centrifugal switch 15 and contacts E3 to primary 12 of the speed sensing transformer 9. The secondary voltage therefore alternates between $Va=70$ v. and $Vb=110$ v. as the teeth and notches of collar 8 pass the transformer core. Since both of these voltages exceed the operating voltage of relay G this relay is immediately operated and remains closed lighting L1 through G1, Q2 and P2. However, relay H which drops out at about 80 volts is operated only during the 110 volt signal and therefore is actuated and released at a rate proportional to the speed of the shaft. As already stated, at 30 R. P. M. the operated intervals of relay H are 0.25 second in length whereas at 1/20 R. P. M. they have a duration of 150 seconds. Since 1/20 R. P. M. is the lowest speed at which the shaft will coast, if relay H remains unchanged for more than 150 seconds the shaft is at rest.

It is the purpose of relays P and Q to detect an unchanged condition in relay H lasting for more than 150 seconds. When relay H is actuated voltage is applied through contacts G1 and H2 to relay P, but no voltage is applied to relay Q since contacts H1 are open. On the other hand, when relay H is not actuated voltage is applied to Q but not to P. Since both relays P and Q have delays of 170 seconds, neither will operate if there is any rotation of the shaft at all since at the minimum rotational speed of 1/20 R. P. M. voltage is never applied for longer than 150 seconds.

When the shaft has stopped relay H will remain either operated or not operated, depending upon the relative positions of collar 8 and transformer 9, and after 170 seconds either P or Q will be actuated. This results in L1 being extinguished by the opening of contacts Q2 or P2 and L2 being energized through contacts Q1 (D3 closed) or P1. Also, after 5 seconds, relay N is actuated closing contact N1. The purpose of the 5 second delay is to prevent a momentary operation of N when the check-out operation is completed and the D and E relays operate.

When the right hand end of shaft 1 has ceased movement and contact N1' in zero speed detector circuit 7 has closed by the same process as that described above, the disconnect control stations are energized permitting operation of the disconnects.

I claim:

1. A speed indicator comprising means for producing a series of substantially rectangular voltage pulses such that the duration of said pulses and the intervals between said pulses are each equal to the same constant divided by the speed to be indicated, a first relay having normally open and normally closed contacts, means for applying said pulses to said first relay for energizing it for the duration of each pulse, second and third relays having equal predetermined delays, means for applying an energizing voltage to said second relay through said normally open contacts and to said third relay through said normally closed contacts whereby said second relay is actuated when the duration of said pulses exceeds said predetermined delay and said third relay is actuated when said interval between pulses exceeds said predetermined delay, and means responsive to the actuation of either of said second and third relays to indicate the fact.

2. A speed indicator comprising means for producing a substantially rectangular voltage wave consisting in successive alternations between greater and lesser voltages in which the durations of the greater and lesser voltages are each equal to the same constant divided by the speed to be indicated; means for applying said greater and lesser voltages to first and second relays connected in parallel, said first relay having an operating threshold below said lesser voltage and said second relay having an operating threshold between said lesser and greater voltages; a first indicator circuit and a second indicator circuit; means responsive to actuation of said first relay to energize said first indicator circuit; third and fourth relays each having equal predetermined delays; means operative when said first and second relays are actuated for applying energizing voltage to said third relay; means operative when said first relay is actuated and said second relay is not actuated to apply energizing voltage to said fourth relay; and means operative when either of said third and fourth relays are actuated to deenergize said first indicator circuit and energize said second indicator circuit.

3. Apparatus as claimed in claim 2 in which the predetermined delay of said third and fourth relays exceeds the duration of either of said greater and lesser voltages at the lowest possible value of said speed.

4. Apparatus for producing a substantially rectangular voltage wave consisting of successive alternations between greater and lesser voltages in which the durations of the greater and lesser voltages are equal to the same constant divided by the speed of a revolving shaft comprising a collar on said shaft having good magnetic permeability and having a plurality of substantially rectangular notches of equal angular extent, said notches being separated by angular distances equal to the angular extent of the notches; a transformer having a primary winding and a secondary winding on a core, said core having extensions forming a leakage path for the flux of said primary winding, said transformer being fixed and having said extensions in proximity to said collar whereby the permeance of said leakage path is a minimum and the primary-secondary coupling is a maximum when a notch is opposite said extensions and the permeance of said leakage path is a maximum and the primary-secondary coupling a minimum when a portion of the collar between notches is opposite said extensions; and means for applying constant A. C. energization to said primary winding.

5. A zero speed detector for a high inertia shaft capable of a very low minimum coasting speed, said indicator comprising: normally deenergized generator means associated with said shaft and operative when energized to produce between a pair of terminals a substantially rectangular voltage wave consisting of successive alternations between high and low voltages in which the durations of the high and low voltages are each equal to an interval T that is inversely proportional to the speed of said shaft; a first relay having a delay considerably in excess of the value of T corresponding to the lowest shaft coasting speed; a potential divider having a high voltage tap, a low voltage tap and a common tap, the voltages of said high and low voltage taps relative to said common tap being equal to the high and low voltages at said terminals, said low voltage tap and common tap being normally connected to said terminals; a second relay having an operating threshold voltage less than the low voltage at said terminals connected across said terminals; a third relay having an operating threshold voltage between the low and high voltages at said terminals connected across said terminals; means for initiating operation of the zero speed detector by applying A. C. energization to said first relay and said potential divider; means acting upon energization of said second relay to apply energization simultaneously to a fourth relay having a holding circuit, a first indicator circuit and, provided said third relay is not operated, a fifth relay having a delay less than the delay of said first relay but greater than the value of T corresponding to the lowest shaft coasting speed; means acting upon operation of said fifth relay to energize a sixth relay having a holding circuit; means acting upon operation of said first relay to disconnect the low voltage tap of said potential divider from the one of said terminals to which it is normally connected and to connect the high voltage tap thereto; means acting upon energization of said third relay to energize a seventh relay having a delay equal to that of said fifth relay, provided said second relay is also actuated, and to deenergize said fifth relay; means acting upon operation of said seventh relay to energize an eighth relay; means acting when said fourth, sixth and eighth relays are simultaneously in an energized state for energizing a ninth relay having a holding circuit; means acting when said ninth relay is energized to energize a tenth relay and to break the holding circuits of said fourth and sixth relays and the energizing circuit of said eighth relay; means acting when said tenth relay is energized to deenergize said first relay, to deenergize said potential divider, to disconnect the common tap of said potential divider from the one of said terminals to which it is normally connected and to energize said generator means; means acting when both said ninth and tenth relays are energized to energize a second indicator circuit; means acting when said ninth and tenth relays are energized and said fifth relay is operated to energize a zero speed indicator and to energize an eleventh relay; and means acting when said tenth relay is energized and said seventh relay is operated to energize said zero speed indicator and said eleventh relay; said eleventh relay having normally open contacts usable in an external circuit.

6. A high inertia compressor, as for a wind tunnel, having a shaft carrying a plurality of compressor stages, said shaft being driven from each end and having disconnects located between adjacent stages, a zero speed detector circuit arranged to indicate the speed of one end of said shaft, a second similar zero speed detector circuit connected to indicate the speed of the other end of said shaft, each of said detector circuits having contacts that are open when said shaft is rotating and closed when said shaft is at rest, and control means for said disconnects having an interlock circuit containing the contacts of said detector circuits connected in series whereby said control means are disabled if the contacts of either detector are open.

7. Apparatus for producing a substantially rectangular voltage wave consisting of successive alternations between greater and lesser voltage in which the durations of the greater and lesser voltages are equal to the same constant divided by the speed of a revolving shaft comprising a collar of magnetic material on said shaft, said collar being divided about its circumference into an even number of equal sectors with alternate sectors having equal radii and one set of alternate sectors having a greater radius than the other set; a stationary transformer having a primary winding and a secondary winding on a magnetic core, said core having extensions positioned adjacent to the circumference of said collar and forming with the adjacent portion of said collar a leakage path for the primary flux, whereby the reluctance of said leakage path and the voltage induced in said secondary when said primary is energized have a high value when said extensions are adjacent a collar sector of greater radius and a low value when adjacent a sector of lesser radius; and means for applying a constant A. C. energization to said primary winding.

References Cited in the file of this patent

UNITED STATES PATENTS 2,717,987     Hagen _____ Sept. 13, 1955